United States Patent Office 2,775,103
Patented Dec. 25, 1956

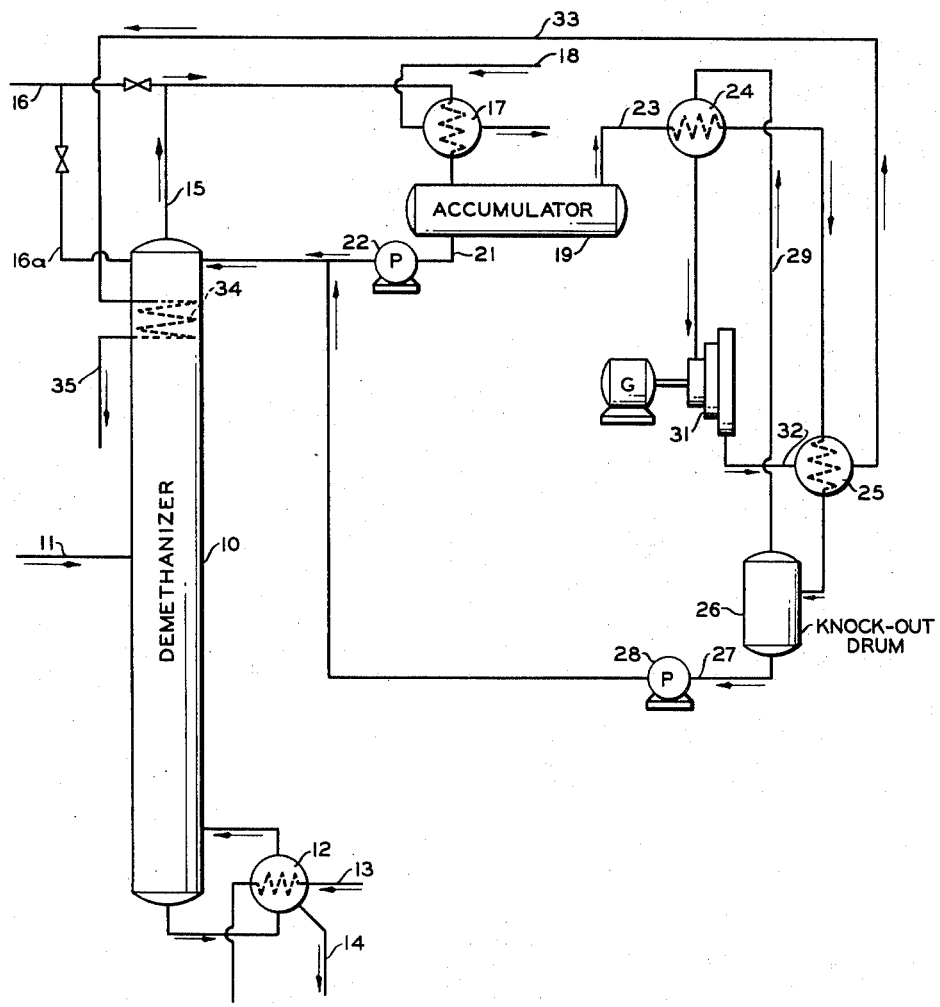

2,775,103

HYDROCARBON SEPARATION

Robert A. Koble, Bartlesville, Okla., and Fred T. Sherk, Pasadena, Tex., assignors to Phillips Petroleum Company, a corporation of Delaware Application December 23, 1954, Serial No. 477,336

7 Claims. (Cl. 62—123)

This invention relates to the separation of normally gaseous hydrocarbons. In one of its more specific aspects, it relates to the separation of ethylene or ethane from a mixture of gases containing these components together with methane and hydrogen. In another of its more specific aspects it relates to the recovery of propylene or propane when used as a solvent for ethylene or ethane in a hydrocarbon separation process.

In the separation of gaseous mixtures containing hydrogen, methane, ethane and/or ethylene, propane and/or propylene, in combination with higher boiling hydrocarbons, the principal difficulty of separation lies in the elimination of methane and hydrogen from such mixture. It has been found advantageous to concentrate the $C_3$ components, such as propylene and propane, and utilize the $C_3$ components as solvent materials for the $C_2$ components, such as ethane and ethylene. In this manner the separation between methane and the $C_2$ hydrocarbons is facilitated. In order to accomplish such separation, a low temperature distillation-absorption process is required. The temperature at the top of the demethanizer, in such process, will ordinarily be in the order of $-112°$ F. Such low temperature processes require at least two levels of ethane or ethylene refrigeration in order to avoid an excessive loss of $C_3$ hydrocarbons in the effluent gas. The demethanizer herein referred to comprises a reboiled absorber wherein distillation and absorption are combined. This process is also referred to as extractive distillation.

Each of the following objects will be attained by at least one of the aspects of the invention.

It is an object of this invention to provide a method for the separation of ethane and/or ethylene from a mixture of gases containing ethane and/or ethylene in combination with methane and hydrogen.

Another object of the invention is to provide an apparatus for the separation of ethane and ethylene from methane and hydrogen wherein only one level of ethane or ethylene refrigeration is employed.

It is still another object of this invention to provide a process for the recovery of $C_3$ hydrocarbons which are used as solvents for the separation of $C_2$ hydrocarbons from methane and hydrogen.

Other objects and advantages of the invention will be apparent to one skilled in the art upon study of this disclosure, including the accompanying drawing wherein A preferred arrangement of equipment for carrying out the invention is diagrammatically illustrated.

According to the present invention, a demethanizer is operated with a top temperature of approximately $-50°$ F. and only one stage of ethylene refrigeration is required. The overhead product from the demethanizer is condensed with a $-65°$ F. refrigerant, such as ethylene refrigerant, and the overhead product still containing propylene goes to a system of heat exchange and expansion in which the product gas is cooled sufficiently to condense propylene. The condensate is returned to the column. The expanded gas is used to cool the overhead product gas and is capable of additional refrigeration over that required to cool the overhead product gas and is used in an intercooler in the demethanizer. Among the advantages of this system are the reduction of propylene losses, the elimination of low stage refrigeration and the recovery of power obtained from the expansion of the high pressure gas. The heat of absorption which is released upon contact of the demethanizer overhead product and the absorbent is removed with the $-65°$ F. refrigerant instead of the low stage refrigerant, as would be required if the column top tray were maintained at $-112°$ F. to prevent excessive loss of propylene. Another advantage of this system is that the demethanizer can be operated even while the expansion system is not operating because the system does not depend upon the expansion of the gases for the cooling required to produce reflux to the demethanizer or for absorbent cooling. It is realized that operation during a period of time when the expansion system is not operating would result in excessive loss of propylene.

The separation system of this invention can be employed for the separation of ethane and methane contained in a natural gas feed stream using propane, also obtained from the natural gas, as the absorbent or solvent.

The principal and preferred use of this system, however, is in the separation of ethylene from a gas containing ethylene in combination with methane and hydrogen. The effluent gas from a hydrocarbon cracking process provides such mixture and the increasing industrial demands for ethylene renders the recovery of ethylene from such stream a desirable operation.

The invention will now be described with reference to the drawing wherein a demethanizer 10 receives a feed stream from a source such as the gaseous effluent from a hydrocarbon cracking process which enters demethanizer 10 at inlet 11. The temperature at the bottom of demethanizer 10 is maintained by reboiler 12 having a heat source 13. The kettle bottom product from demethanizer 10 is removed through line 14. Demethanizer overhead line 15 is joined by solvent line 16 and the combined streams pass to heat exchanger 17 and are cooled by external refrigeration through line 18. Alternatively solvent can be added directly to the demethanizer 10 through line 16a. The cooled mixture is passed to accumulator 19 wherein the mixture is separated into liquid and gaseous phases and the liquid phase is withdrawn through line 21 and forced by pump 22 into the top of demethanizer 10 as reflux. The gaseous phase of accumulator 19 is passed by way of line 23 through exchanger 24 and through heat exchanger 25 to knock-out drum 26. The liquid which accumulates in knock-out drum 26 is passed by line 27 and pump 28 to the top of demethanizer 10 as reflux. The gas from knock-nut drum 26 passes through line 29 in heat exchange relationship with the gas in line 23 and to expansion means 31 which can be any conventional expansion equipment such as a turboexpander which performs work such as driving a generator. In the expansion means 31, the pressure and the temperature of the gas are reduced and this gas then passes through line 32 and through heat exchanger 25 in indirect heat exchange relationship with the gas in line 23. The cooling gas effluent from heat exchanger 25 then passes through line 33 to cooling coil 34 located in the upper portion of demethanizer 10 in indirect heat exchange with the interior of demethanizer 10. The effluent gas, which is composed principally of methane and hydrogen is removed from the system through line 35 and is used as fuel or for other purposes. The demethanizer bottom product removed through line 14 is composed principally of ethylene and propylene and this material is removed from the system and passed to a separating means (not shown) such as a conventional fractionator.

The operation of the system of this invention will be described, in the following example, applied to the effluent gas from a hydrocarbon cracking process.

EXAMPLE

The feed to the demethanizer enters at a temperature of approximately −56° F. The demethanizer is operated at a pressure of for example 400 p. s. i. a., a bottom temperature of 55° F. and a top temperature of −50° F. The overhead product is mixed with a stream of propylene maintained at −28° F. and the resulting mixture is cooled to −56° F. by heat exchange with an external refrigerant, for example, ethylene. The resulting mixture is separated into a liquid phase and a gaseous phase and the liquid phase is pumped back to the top of the demethanizer as reflux at about −54° F. The gaseous phase is passed through a first heat exchanger, cooled to approximately −82° F., through a second heat exchanger and cooled to approximately −112° F., and then passed to the propylene knock-out drum wherein a liquid phase and a gaseous phase are separated. The liquid phase is pumped back to the top of the demethanizer as reflux. The gaseous phase, at approximately −112° F., is passed through the first heat exchanger as the cooling gas in heat exchange relationship with the gas from the accumulator. This gas at a temperature of approximately −65° F. and a pressure of approximately 397 p. s. i. a. is passed to an expansion engine where the pressure is reduced to approximately 70 p. s. i. a. and the temperature is reduced to approximately −173° F. This cooled, low temperature gas is then passed through the second heat exchanger in heat exchange relationship with the gas from the accumulator. The effluent gas from this heat exchanger, having a temperature of approximately −120° F., is then passed to the intercooler in indirect heat exchange relationship with the interior of the upper portion of the demethanizer. The effluent gas from the intercooler is then removed from the system.

The demethanizer kettle product is removed from the system and passed to a separation zone where the ethylene and propylene components are recovered as the principal products of the process.

The compositions of the feed to the demethanizer, the demethanizer overhead product and the demethanizer kettle product are shown in Table I.

*Table 1*

| Component | Mol Percent | | | |
|---|---|---|---|---|
| | Feed | Solvent | Overhead Product | Kettle Product |
| $H_2$ Hydrogen | 9.65 | | 18.88 | |
| $CH_4$ Methane | 40.27 | | 78.51 | 0.04 |
| $C_2H_2$ Acetylene | 0.48 | | | 0.61 |
| $C_2H_4$ Ethylene | 30.86 | | 1.83 | 38.13 |
| $C_2H_6$ Ethane | 6.75 | 4.46 | .01 | 10.29 |
| $C_3H_4$ Propadiene | 0.05 | 0.42 | | 0.22 |
| $C_3H_4$ Methyl Acetylene | 0.07 | 0.60 | | 0.32 |
| $C_3H_6$ Propylene | 11.29 | 89.80 | 0.75 | 47.87 |
| $C_3H_8$ Propane | 0.51 | 4.16 | 0.02 | 2.22 |
| $C_4H_6$ Butadiene | 0.03 | 0.22 | | 0.12 |
| $C_4H_8$ Butylene | 0.04 | 0.32 | | 0.17 |
| n-$C_4H_{10}$ Normal Butane | 0.002 | 0.02 | | 0.01 |
| | 100.00 | 100.00 | 100.00 | 100.00 |

The conditions of temperature and pressure hereinbefore set forth were those preferred for the composition of the feed shown in Table I. The conditions will vary as the composition of the feed varies and the invention is operable over a fairly broad range of conditions. Thus the feed to the demethanizer can be introduced under any condition of pressure which is higher than demethanizer pressure and any temperature. A temperature as low as possible is usually preferred.

Propylene is the preferred solvent in the process of this invention when the process is practiced upon the gaseous effluent of a hydrocarbon cracking operation and propane is the preferred solvent when operating upon a natural gas feed stream because in both gases there is usually an excess of $C_3$ hydrocarbons. Heavier hydrocarbons, such as $C_4$ hydrocarbons including isobutylene, normal butane, and butenes, can be employed when these hydrocarbons are available in sufficient quantities. While it is preferred to add the solvent to the demethanizer overhead product as shown and described, the invention can be practiced with introduction of the solvent to the top of the demethanizer.

When either propylene or propane is utilized as the solvent, the demethanizer can be operated at pressures from about 300–600 p. s. i. a., the preferred operating range will usually be between 300–500 p. s. i. a. Demethanizer overhead temperature and accumulator temperature will usually be between 0° F. and −70° F. depending upon solvent rate, pressure, solvent content of overhead gas, etc. The preferred range will usually be −25 to −65° F. The accumulator temperature will normally be somewhat lower than that of the top tray. The temperature of the materials in the solvent knock-out drum will be in the range of −120 to −90° F. depending upon the pressure and the pressure will be governed directly by that of the demethanizer. The expansion engine outlet pressure can be between atmospheric and 100 p. s. i. a. depending upon the amount of cooling required and also upon the use to which the demethanizer overhead product is directed. The pressure of 70 p. s. i. a. used in the example was selected so that the demethanizer overhead could be discharged directly into the plant fuel line. With mostly methane in the residue gas, and expansion to atmospheric pressure, temperatures approaching −250° F. are possible. The preferred range of temperature at the outlet of the expansion engine is between −160 to −200° F.

Temperatures and temperature approaches in the heat exchangers will vary with changes in the above steps. For example, −82° F. between the heat exchangers is obtained when −112° gas is warmed to within 9° of the −56° F. accumulator gas. If a lower temperature expanded gas were desired, less heat exchange on this gas would be required. The difference would be made up on the other exchanger. With a warmer accumulator gas, the expansion engine feed temperature would of course be higher.

Variations and modifications are possible within the scope of the invention, the essence of which is an improved method of separating $C_2$ hydrocarbons from methane by using a $C_3$ or heavier absorbent in a demethanizer, cooling the demethanizer overhead, returning resulting liquid to the demethanizer, expanding the overhead, heated gas so as to do work and using the expanded gas to provide cooling in the preceding steps.

That which is claimed is:

1. A demethanizing system comprising a demethanizer having a feed inlet, a bottoms product outlet, an overhead products outlet, and a reflux inlet; means for mixing the overhead product with a solvent; means for cooling a resulting mixture; a first means for separating said mixture into a liquid and a gas; means for passing the resulting liquid to the reflux inlet of said demethanizer; means for cooling said resulting gas, as hereinafter set forth; a second means for separating a liquid from said gas; means for passing a resulting liquid to the reflux inlet of said demethanizer; gas expanding means; and means for passing the gas from the second separator through said gas expanding means and in indirect heat exchange relationship with the gas from said first separator as the hereinbefore referred to cooling means.

2. A demethanizing system comprising a demethanizer having a feed inlet, a bottoms product outlet, an overhead product outlet and a reflux inlet; a first heat exchanger means in communication with a source of refrigerant a first conduit means in communication with the demethanizer overhead outlet and the inlet of said first heat exchanger, in indirect heat exchange relationship with said refrigerant; a second conduit means in communication with a source of solvent and with said first conduit; a first liquid and gas separator means having an inlet, a gas outlet and a liquid outlet; conduit means in communication with said separator inlet and the outlet of said heat exchanger in indirect heat exchange relationship with said refrigerant; means communicating with the separator liquid outlet and the demethanizer reflux inlet for passing liquid from said separator to said demethanizer; a second heat exchanger; a third heat exchanger; a second liquid and gas separator having an inlet, a gas outlet and a liquid outlet; conduit means connecting the gas outlet of the first separator with the inlet of the second separator through said second and third heat exchangers in indirect heat exchange relationship with cooling gases hereinafter described; a conduit means communicating with the liquid outlet of the second separator and the reflux inlet of the demethanizer; an expansion engine; conduit means communicating with the gas outlet of the second separator and the inlet of said expansion engine through the cooling side of said second heat exchanger for conducting cooling gas therethrough; a cooling coil located in the upper portion of said demethanizer; and conduit means communicating with the outlet of said expansion engine and the inlet of said cooling coil through the cooling side of said third heat exchanger for conducting cooling gas therethrough.

3. In a process for recovering a hydrocarbon containing two carbon atoms per molecule from a mixture containing said hydrocarbon together with methane wherein said mixture is cooled and compressed and fractionated in a demethanizing zone, the improvement which comprises contacting the gaseous demethanizing zone effluent with a liquid hydrocarbon solvent containing three to four carbon atoms per molecule; cooling a resultant mixture; recovering and passing resulting liquid to the demethanizing zone as reflux; passing remaining gas through a first and second heat exchange zone as the warm medium; recovering and passing resulting liquid to said demethanizing zone as reflux; passing remaining gas through said first heat exchange zone as the cool medium; passing said gas through an expansion zone; passing said gas through said second heat exchange zone as the cool medium; passing said gas in indirect heat exchange with the interior of said demethanizing zone; recovering said gas as a product of the process; and recovering said hydrocarbon containing two carbon atoms per molecule dissolved in hydrocarbons containing from three to four carbon atoms per molecule from the bottom of the demethanizing zone as an additional product of the process.

4. In a process for receiving a hydrocarbon containing two carbon atoms per molecule from a mixture containing said hydrocarbon together with methane and heavier hydrocarbons wherein said mixture is cooled and compressed and fractionated in a demethanizing zone, the improvement which comprises contacting the gaseous mixture in the demethanizing zone with a hydrocarbon solvent containing three to four carbon atoms per molecule; cooling the demethanizing zone overhead product so as to condense part of said heavier hydrocarbons; passing resulting liquid to said demethanizing zone as reflux; expanding resulting gas; passing said expanded gas in indirect heat exchange relationship with the gaseous phase of said demethanizing zone overhead product; and passing said expanded gas in indirect heat exchange with the interior of said demethanizing zone; recovering said expanded gas as a product of the process; and recovering said hydrocarbon containing two carbon atoms per molecule dissolved in heavier hydrocarbons from said demethanizing zone as a product of the process.

5. The process of claim 3 wherein the hydrocarbon containing two carbon atoms per molecule is ethylene and the heavier hydrocarbon is propylene.

6. The process of claim 3 wherein the hydrocarbon containing two carbon atoms per molecule is ethane and the heavier hydrocarbon is propane.

7. In a process for recovering a hydrocarbon containing two carbon atoms per molecule from a mixture containing said hydrocarbon together with methane wherein said mixture is cooled and compressed and fractionated in a demethanizing zone, the improvement which comprises contacting the gaseous demethanizing zone effluent with a liquid hydrocarbon solvent containing three to four carbon atoms per molecule; cooling a resulting mixture; separating vapor and liquid phases in a first separation step; recovering and passing liquid, resulting from said first separation step, to the demethanizing zone as reflux; cooling remaining gas, as hereinafter set forth; separating liquid, resulting from said last named cooling step, from said gas, in a second separation step; passing resulting liquid to the reflux inlet of said demethanizer; expanding remaining gas; and passing the expanded gas in indirect heat exchange relationship with the gas from said first separating step as the hereinbefore referred to cooling step.

References Cited in the file of this patent
UNITED STATES PATENTS

| | | |
|---|---|---|
| 2,552,451 | Patterson | May 8, 1951 |
| 2,601,559 | Deming | June 24, 1952 |
| 2,666,019 | Winn | Jan. 12, 1954 |
| 2,713,781 | Williams | July 26, 1955 |